(12) United States Patent
Qu et al.

(10) Patent No.: US 10,999,350 B2
(45) Date of Patent: May 4, 2021

(54) SUPERCOMPUTER SYSTEM, METHOD OF DATA TRANSMISSION IN SUCH SUPERCOMPUTER SYSTEM AND ASSOCIATED COMPUTER PROGRAM PRODUCT

(71) Applicant: TOTAL SA, Courbevoie (FR)

(72) Inventors: Long Qu, Pau (FR); Bernard Cazalis, Pau (FR)

(73) Assignee: TOTAL SA, Courbevoie (FR)

( * ) Notice: Subject to any disclaimer, the term of this patent is extended or adjusted under 35 U.S.C. 154(b) by 0 days.

(21) Appl. No.: 16/388,947

(22) Filed: Apr. 19, 2019

(65) Prior Publication Data

US 2019/0327289 A1 Oct. 24, 2019

(30) Foreign Application Priority Data

Apr. 20, 2018 (EP) ..................................... 18305491

(51) Int. Cl.
| | | |
|---|---|---|
| *G06F 15/16* | (2006.01) | |
| *H04L 29/08* | (2006.01) | |
| *G06F 16/182* | (2019.01) | |
| *H04L 29/06* | (2006.01) | |

(52) U.S. Cl.
CPC ............ *H04L 67/06* (2013.01); *G06F 16/183* (2019.01); *H04L 67/10* (2013.01); *H04L 67/42* (2013.01)

(58) Field of Classification Search
CPC ........ G06F 16/183; H04L 67/10; H04L 67/42
See application file for complete search history.

(56) References Cited

U.S. PATENT DOCUMENTS

| | | | | |
|---|---|---|---|---|
| 6,418,479 B1 * | 7/2002 | Houssein | ............ | G06F 13/4027 709/236 |
| 6,757,705 B1 * | 6/2004 | Pardikar | ............. | G06F 21/6218 709/203 |
| 6,999,958 B2 * | 2/2006 | Carlson | ............. | G06F 16/24549 |
| 7,840,662 B1 * | 11/2010 | Natanzon | ............ | H04L 67/1097 709/223 |
| 10,367,676 B1 * | 7/2019 | Vermeulen | .......... | H04L 41/0213 |
| 2002/0147869 A1 * | 10/2002 | Owen | ................... | H04L 1/1671 710/105 |

(Continued)

OTHER PUBLICATIONS

Extended European Search Report issued in corresponding European Patent Application No. 18305491.5 dated Oct. 22, 2018.

(Continued)

*Primary Examiner* — Hieu T Hoang
(74) *Attorney, Agent, or Firm* — Troutman Pepper Hamilton Sanders LLP

(57) ABSTRACT

A supercomputer system having at least one server, a plurality of compute clients and a distributed file system. The server is configured to distribute computation tickets and each compute client is configured to request a computation ticket. The distributed file system is configured to stock input data for all tasks and output data produced by the compute clients. The supercomputer system is characterized in that it further includes at least one I/O client configured to exchange data with each compute client and with the distributed file system, to distribute input data to at least some of the compute clients or to collect output data produced by at least some of the compute clients.

14 Claims, 3 Drawing Sheets

(56) References Cited

U.S. PATENT DOCUMENTS

| | | | |
|---|---|---|---|
| 2007/0150425 A1* | 6/2007 | Bryant | G06F 9/5016 |
| | | | 706/15 |
| 2008/0065583 A1* | 3/2008 | Coverston | G06F 16/16 |
| 2008/0120435 A1* | 5/2008 | Moreira | G06F 16/1858 |
| | | | 710/1 |
| 2009/0113438 A1* | 4/2009 | Barness | H04L 67/325 |
| | | | 718/103 |
| 2011/0145363 A1* | 6/2011 | Ananthanarayanan | |
| | | | G06F 16/172 |
| | | | 709/218 |
| 2014/0012936 A1* | 1/2014 | Aikoh | G06F 12/084 |
| | | | 709/213 |
| 2014/0082232 A1* | 3/2014 | Sugawara | G06F 12/00 |
| | | | 710/38 |
| 2014/0282599 A1* | 9/2014 | Aho | G06F 9/4806 |
| | | | 718/106 |
| 2015/0263900 A1 | 9/2015 | Poluakov et al. | |
| 2016/0320759 A1* | 11/2016 | MacHa | G06F 11/2035 |
| 2018/0081821 A1* | 3/2018 | Beaverson | G06F 3/0647 |

OTHER PUBLICATIONS

Pallickara S L et al., "SWARM: Scheduling Large-Scale Jobs over the Loosely-Coupled HPC Clusters" Escience, 2008. Escience '08. IEEE Fourth International Conference on. IEEE (Dec. 7, 2008), pp. 285-282 (cited in EESR dated Oct. 22, 2018).

\* cited by examiner

SUPERCOMPUTER SYSTEM, METHOD OF DATA TRANSMISSION IN SUCH SUPERCOMPUTER SYSTEM AND ASSOCIATED COMPUTER PROGRAM PRODUCT

CROSS REFERENCE TO RELATED APPLICATION

This application claims priority of European Patent Application No. 18305491.5 filed Apr. 20, 2018. The entire contents of which are hereby incorporated by reference.

FIELD OF THE INVENTION

The present invention concerns a supercomputer system.

The present invention concerns also a method of data transmission in such supercomputer system and associated computer program product.

The field of the invention is High Performance Computer systems known as HPC systems, used to process a big volume of data. Such data comprises for example information relative to a geological structure of the ground in a given zone or information relative to a seismic activity in such zone.

In the whole text, a supercomputer system is defined as an HPC system.

BACKGROUND OF THE INVENTION

In the art, a supercomputer system is usually formed using a large number of compute nodes connected one to another by a computer network.

A Client/Server model is a well-known technology which can be implemented in an HPC system. It has an advantage to present a high availability of the service. In the HPC systems, this model is implemented using compute nodes to ensure the execution of different computation tasks.

Particularly, according to this model, at least some of the compute nodes form a server able to manage the tasks execution performed by a plurality of clients formed by the other nodes.

When a client is available to execute a task, it is able to request from the server a ticket which defines a specific task. Upon receiving such request, the server sends to the client a ticket defining a task to be executed by the client.

To execute the task, the client needs to read input data from a specified file storage system and after the task execution, to write produced output data to such system. After, the output data produced by several clients, can be post-processed according to the final destination of this data.

The process of reading input data and writing output data by the nodes is known in the art as I/O processing.

Contrary to a classical computer network using for example a specific server to stock all data used in the network, the HPC systems use generally a distributed file system for data storage.

Such distributed file system is formed by several compute nodes and uses a specific network protocol to give to the client access to data.

A large number of distributed file systems are known in the art. Among these systems, one can recite Lustre File System or General Parallel File System (known as GPFS).

The performances of an HPC system depend notably on the computing power of the compute nodes forming the system. According to the Moore's law, this power doubles approximately every 18 months.

However, the computing power is not the only criterion defining the performances of an HPC system. Particularly, the speed rate of the I/O processing should also be considered.

Indeed, comparing to the computing power growing, the speed rate of the I/O processing grows much slower.

Hence, in the actual HPC systems, data processing is slowed down rather by the I/O processing than by the computing power.

SUMMARY OF THE INVENTION

The present invention aims to improve the speed rate of the I/O processing in the HPC systems.

For this purpose, the present invention proposes a supercomputer system comprising at least one server, a plurality of compute clients and a distributed file system; the server being configured to distribute computation tickets to the compute clients; each compute client being configured to request a computation ticket from the server and upon receipt of a computation ticket from the server, to execute a task defined by this ticket, each task comprising analyzing input data and producing output data; the distributed file system being configured to stock input data for all tasks and output data produced by the compute clients; and the supercomputer system being characterized in that it further comprises at least one I/O client configured to exchange data with each compute client and with the distributed file system, to distribute input data to at least some of the compute clients or to collect output data produced by at least some of the compute clients.

Provided with these features, the supercomputer system makes it possible to accelerate considerably I/O exchanges inside the system. Indeed, the I/O exchanges with the I/O client are faster than the I/O exchanges with the distributed file system. This is particularly advantageous when redundant or similar data is frequently used by the compute clients.

In other embodiments, the supercomputer system may comprise one or several of the following optional features, taken individually or in any technically feasible combination:

each compute client is configured to request an identifier of the I/O client from the server;

an identifier of the I/O client is transmitted by the server after the execution of the corresponding task by the corresponding compute client;

each compute client is configured to request corresponding input data from the I/O client and if the I/O client is unable to provide the requested input data, to read the corresponding input data from the distributed file system;

the I/O client is configured to read periodically input data usable by the compute clients and advantageously determined by the server, from the distributed file system;

the I/O client is configured to implement a pre-processing of the read input data from the distributed file system;

each compute client is configured to send all produced output data to the I/O client;

the I/O client is configured to implement a post-processing of the collected output data;

the I/O client is configured to stock in the distributed file system results of the post-processing;

the I/O client is configured to write periodically in the distributed file system the collected output data;

the server is configured to designate a new I/O client, notably from one of the compute clients, if the current I/O client is not available;

the server, the I/O client, the distributed file system and each compute client are implemented by one or several physical compute nodes.

The invention also relates to a method of data transmission in a supercomputer system comprising at least one server, a plurality of compute clients, an I/O client and a distributed file system.

The method being implemented by at least one compute client and comprising the following steps:
  requesting a computation ticket from the server;
  receiving a computation ticket from the server; and
  executing a task defined by this ticket, each task comprising analyzing input data and producing output data, input data being stocked in the distributed file system and output data being intended to be stocked or processing in or by the distributed file system;
  the method being characterized in that it further comprises a step of collecting input data from the I/O client or a step of sending output data to the I/O client.

The invention also relates to a computer program product comprising software instructions which, when executed by a processor, implement a method defined above.

BRIEF DESCRIPTION OF THE DRAWINGS

The invention and its advantages will be better understood upon reading the following description, which is given solely by way of non-limiting example and which is made with reference to the appended drawings, in which.

DETAILED DESCRIPTION OF THE INVENTION

Figure 1:
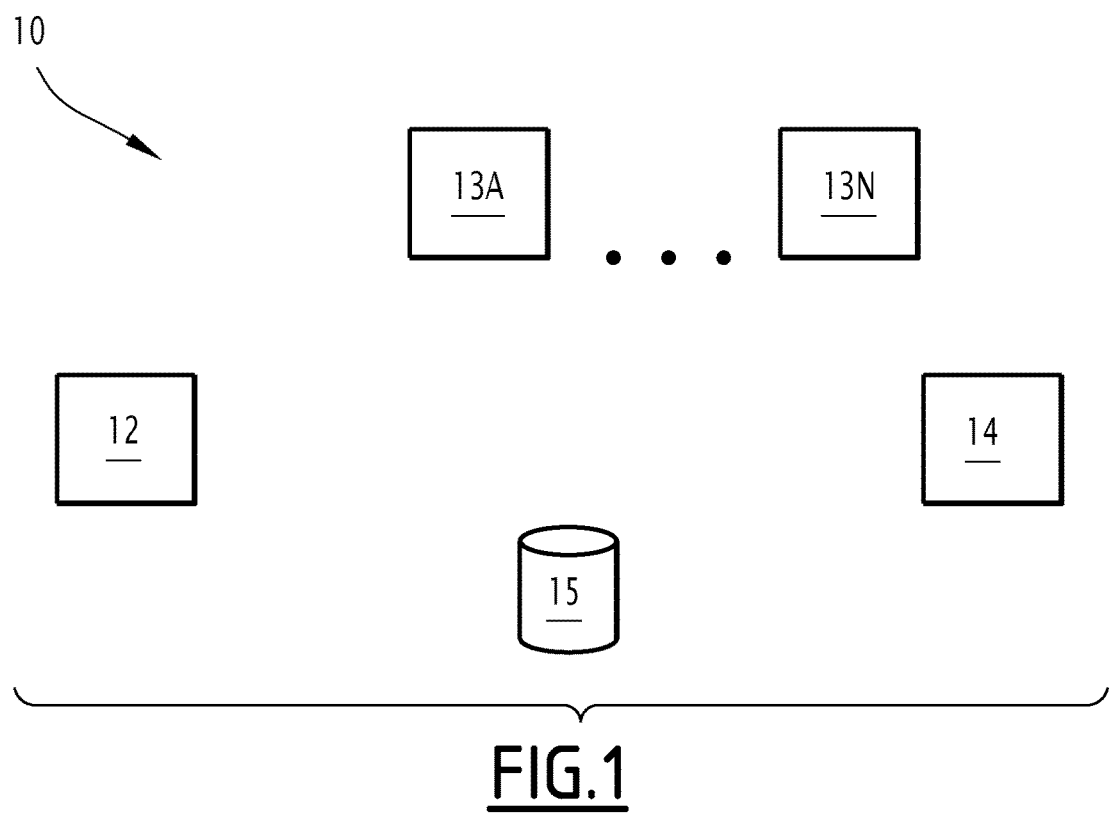
FIG. 1 is a schematic view of a supercomputer system according to the invention.

The supercomputer system 10 of FIG. 1 is an HPC system configured to process a large volume of data. Such data comprises for example information relative to a geological structure of the ground in a given zone or information relative to a seismic activity in such zone.

The supercomputer system 10 of FIG. 1 is formed by a plurality of compute nodes connected one to another by a computer network.

Each compute node comprises one or several processors, a memory module able to stock at least some processing data items and an interface module connecting this compute node to the computer network.

The compute nodes of the supercomputer system 10 form a plurality of computing units.

Particularly, as it is illustrated on FIG. 1, at least some of the compute nodes of the system 10 form at least one server 12, at least some of the compute nodes of the system 10 form a plurality of compute clients 13A, . . . , 13N, at least some of the compute nodes of the system 10 form at least one I/O client 14, and at least some of the compute nodes of the system 10 form a distributed file system 15.

Each of these computing units comprises an identifier making it possible its identification among the other units. Further, the above-mentioned designation "server 12", "compute clients 13A, . . . , 13N", "I/O client 14" and "distributed file system 15" are not frozen and can be interchanged between different computing units as it will be explained below.

The server 12 and the compute clients 13A, . . . , 13N are implemented according to a known "ticket service" model.

In particular, according to this model, the server 12 is configured to generate for each task intended to be executed by the supercomputer system 10, a computation ticket defining this task and to distribute the generated computation tickets to the compute clients 13A, . . . , 13N.

Advantageously, the server 12 is configured ensure an optimized way of using resources including notably the compute clients 13A, . . . , 13N and the distributed file system 15.

Additionally, the server 12 is configured to analyze the I/O requirement of all tasks, and in the case where high redundant usage of a same piece of data occurs or in the case where reduction of output volume of different tasks is possible due to the overlap, the server 12 is configured to designate one the several compute clients 13A, . . . , 13N to become the I/O client 14.

Additionally, in the case where high redundant usage of a same piece of data occurs, the server 12 is configured to distribute the computing tasks to different compute clients 13A, . . . , 13N in a way that all processing tasks use as much as possible same or redundant input data stored in the I/O client.

Additionally, in the case where high redundant usage of a same piece of data occurs, the server 12 is configured to predict data which will be used by the compute clients 13A, . . . , 13N and to the I/O client information about the predicted data.

The predicted data is determined by the server 12 according for example to the nature of the data being processed in a given instant. Thus, for example, for geoscience studies, computing tasks are often distributed among different geometrical locations and have an important surface of overlap. Hence, in this case, the predicted data could be relative to a geometrical location next the geometrical location which is being processed in a given instant.

Each compute client 13A, . . . , 13N is configured to request a computation ticket from the server 12 and upon receipt of a computation ticket from the server 12, to execute the task defined by this ticket.

Each task executed by one of the compute clients 13A, . . . , 13N comprises analyzing input data and producing output data.

The distributed file system 15 is a storage system providing access to data via a network protocol, according to methods known in the art. Hence, as it is known, the distributed file system 15 allows data to be accessed by the server 12 and the clients 13A, . . . , 13N, 14 using the same interfaces and semantics.

According to a preferred embodiment of the invention, the distributed file system 15 is represented by a Lustre File System or by a General Parallel File System (known as GPFS).

The distributed file system 15 is configured to stock input data for all tasks intended to be executed by the compute clients 13A, . . . , 13N and output data produced by these clients.

According to the invention, the I/O client 14 is configured to exchange data between the compute clients 13A, . . . , 13N and the distributed file system 15.

Advantageously, the I/O client 14 is further configured to exchange data between the server 12 and the distributed file system 15.

Particularly, the I/O client 14 is configured to pre-process and distribute input data to at least some of the compute clients 13A, ..., 13N and/or to collect and post-process output data produced by at least some of the compute clients 13A, ..., 13N, as it will be explained in reference with the method of data transmission below.

Figure 2:
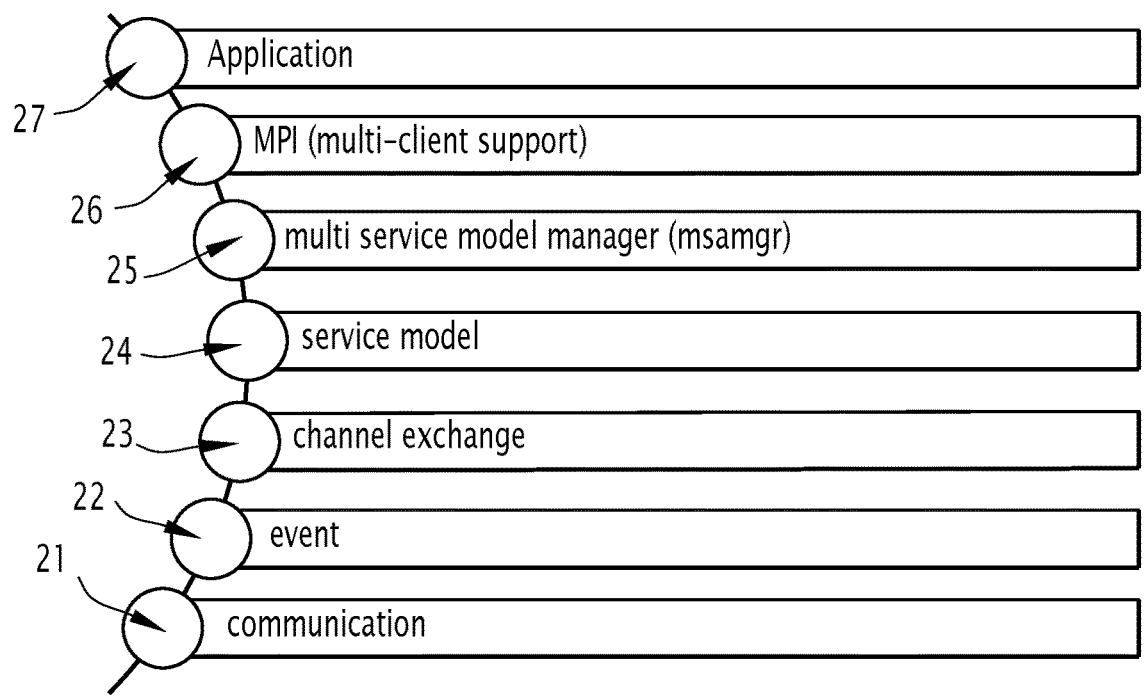
FIG. 2 is a flowchart illustrating the structure of one of the computing units forming the supercomputer system of FIG. 1.

FIG. 2 illustrates different layers implemented in each computing unit of the supercomputer system 10 for making possible the operation of the supercomputer system 10.

In reference to this figure, each computing unit comprises seven layers starting from the lowest level layer 21 and finishing by the highest level layer 27.

The first three bottom layers 21 to 23 ensure that a message is received or a special event is detected by the corresponding computing unit. A special event comprises for example a detection of death of a remote node.

An example implementation of these layers 21 to 23 is based on a TCP/IP socket. This example is explained in the following text.

In more detail, the first layer 21 is a communication layer. This layer forms a basic level of the framework for messages passing between the computing units.

As it is known in the art, each message has a header which contains a service identifier, a client identifier and an operation identifier.

Each message received by the communication layer 21 is in a non-blocking mode to ensure a better scalability of number of messages passing simultaneously. The example implementation of this layer 21 is based for example on a non-blocking socket communication.

The second layer 22 is an event layer. This layer prepares a list of received messages for each connected remote node and also handles connection with each remote node.

An example implementation of this layer 22 requires three threads working together: a main thread ensuring the process of the message, a receiving thread preparing lists of received message by using the communication layer 21 and indicating the main thread if a message is completely received, and a log thread taking care of the connection between nodes. The log thread uses a non-blocking accept and connect for better absorbing the peak connection between the computing units.

The third layer 23 is a channel exchange layer. This layer ensures the connection of a link (socket) and message passing on a particular service served by the link. The connectivity is ensured by the log thread of the event layer 22, and service accessibility is ensured by the receiving thread of the event layer 22.

According to another embodiment of the invention, this implementation of layers 21 to 23 can be replaced by a remote direct memory access, known in the art as RDMA. In this case, the layers 21 and 22 are implemented directly in the hardware.

The forth layer 24 is a service model layer. This layer ensures the implementation of the "ticket service" model explained above.

Particularly, this layer 24 is composed by a list of particular operation functions which are based on the received messages. Once the receiver thread of the communication layer 21 receives an entire message, the main thread of the communication layer 21 finds a service model based on the service defined by the service identifier of this message and then calls a particular operation function inside the service model found.

The fifth layer 25 is a multi-service model manager layer. This layer makes it possible to switch a service model among multiple service models.

Each service model defines the functions operated by a server 12, by a compute client, by an I/O client or by a distributed file system.

According to an advantageous implementation of the invention, switching of the service model makes it possible to redefine the functions operated by the corresponding computing unit so as for example the server 12 can become a "client" and one of the compute clients 13A, ..., 13N can become a "server" or an "I/O client".

According to one embodiment of the invention, the switching between the multi-service models is operated by the server 12 or by "a meta-server" (non-represented on FIG. 1).

The sixth layer 26 is a multi-client support layer (Message Passing Interface known as MPI). This layer makes it possible to the corresponding computing unit to be launched with several MPI processes.

The seventh layer 27 is an application layer. Notably, this layer initializes the multi-service model manager layer 25 and controls the function executed by the corresponding computing unit.

Figure 3:
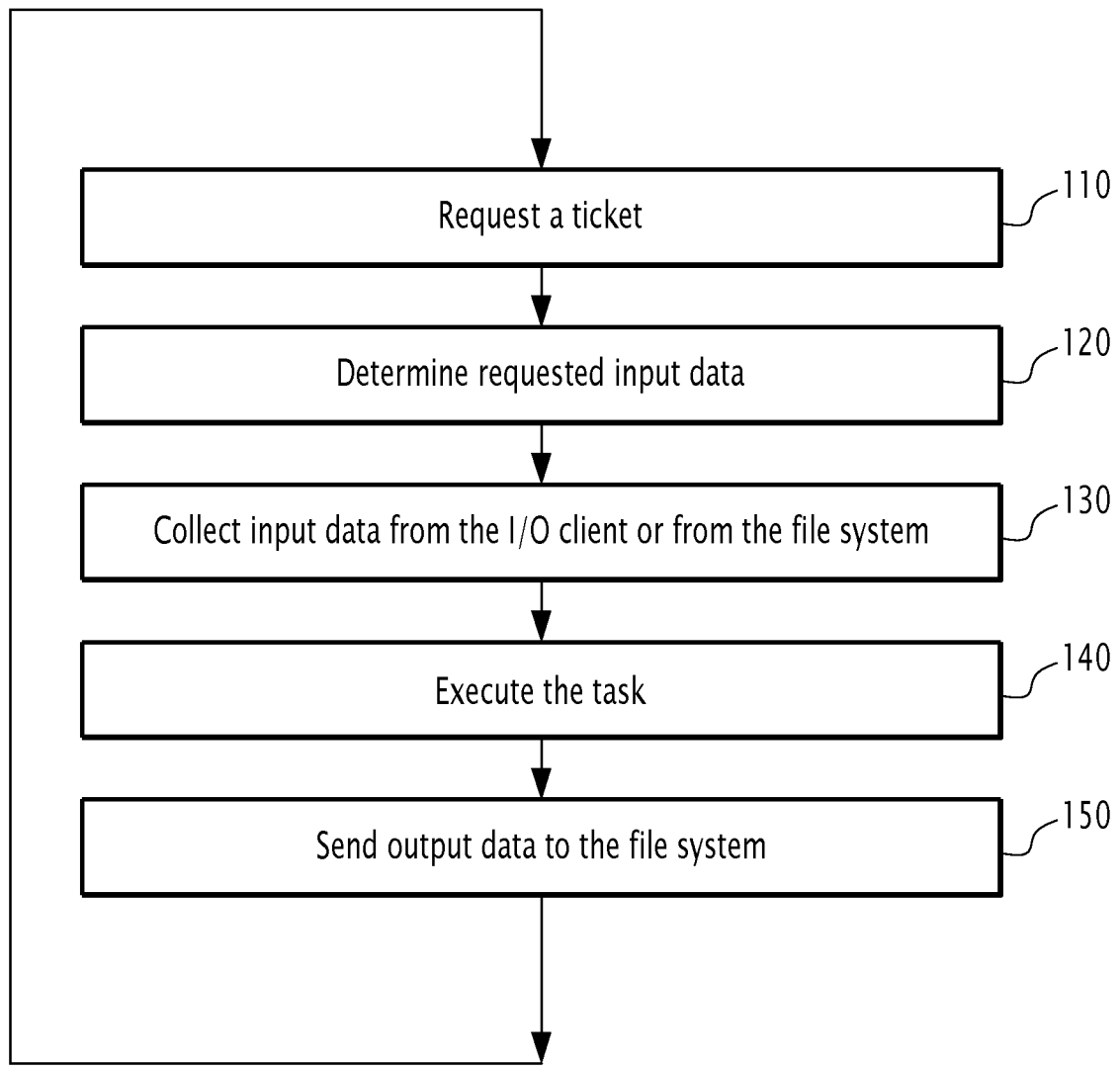
FIG. 3 is a flowchart of a method of data transmission according to a first embodiment of the invention.
Figure 4:
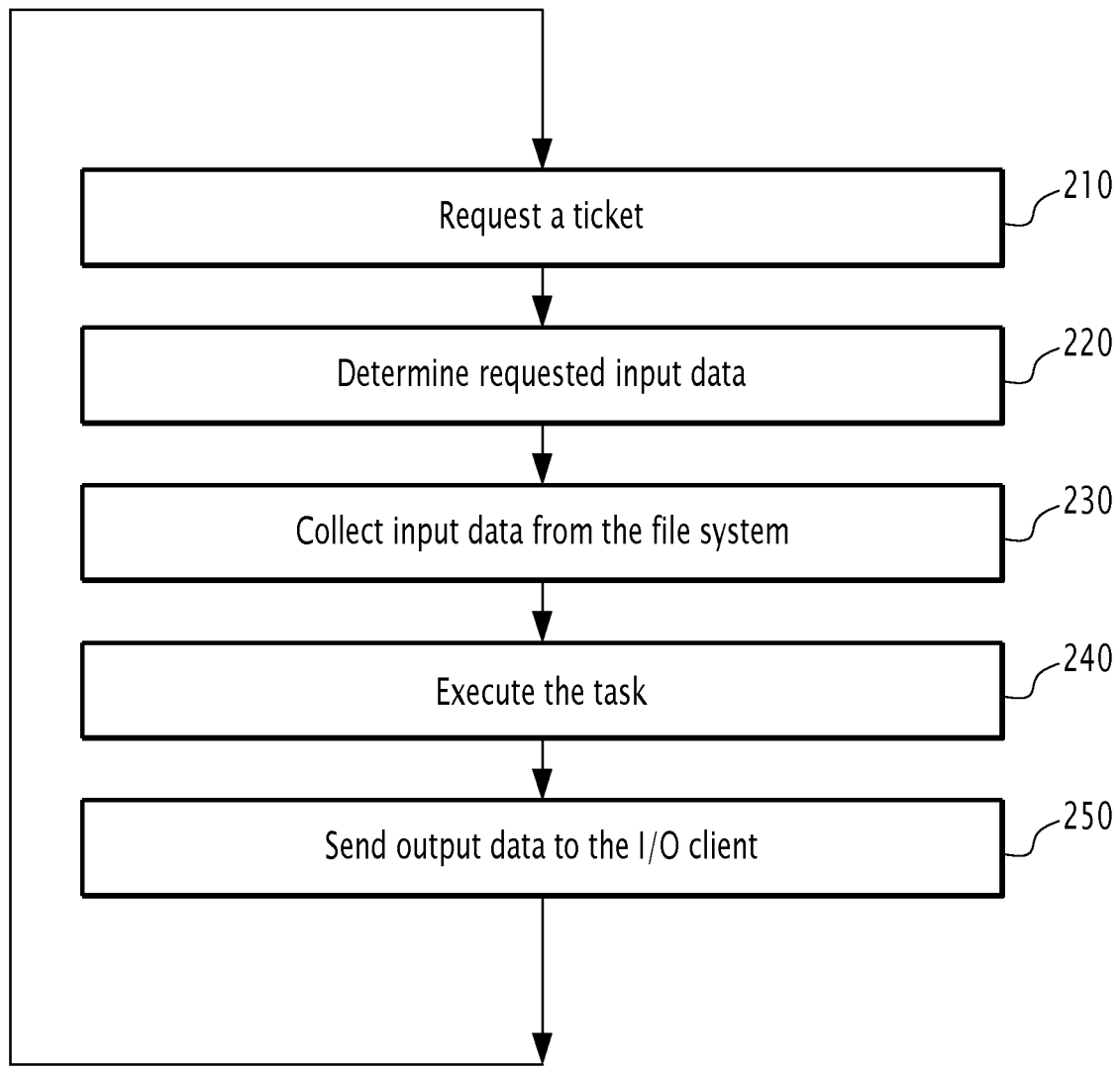
FIG. 4 is a flowchart of a method of data transmission according to a second embodiment of the invention.

The method of data transmission according to the invention will now be explained in reference on FIGS. 3 and 4 illustrating respectfully a flowchart of this method according to a first embodiment and a flowchart of this method according to a second embodiment. However, it should be understood that these embodiments may be combined as it will be explained below.

Referencing to FIG. 3, the method of data transmission according to the first embodiment of the invention is implemented by at least one compute client 13A, ..., 13N. For simplicity reasons, it will be supposed hereinafter that this method is implemented by the compute client 13A.

Initially, the I/O client 14 is designated for example by the server 12 or by any other meta-server. This client 14 is thus called "current I/O client 14" hereinafter.

If the current I/O client 14 is not available during the method's execution, the server 12 or any other meta-server designates another I/O client among for example one of the compute clients. The designated I/O client will be thus called "current I/O client 14".

During the execution of the method, the current I/O client 14 reads periodically from the distributed file system 15 data intended to be input data for the compute clients 13A, ... 13N.

Advantageously, the data to be read by the current I/O client 14 is determined by the server 12. Thus, for example, the data determined by the server 12 is determined according to the tasks generated by the server 12 and corresponds to input data frequently usable to process these tasks. Advantageously, the data determined by the server 12 corresponds to the data predicted by the server 12, i.e. input data that will be used to process current or future tasks.

Advantageously, during the execution of the method, the current I/O client 14 pre-processes at least some data read from the distributed file system 15.

During the initial step 110 of the method, the compute client 13A requests a computation ticket from the server 12. This step is implemented by the client 13A when it is available for computing, which means that it has no task to be executed.

Advantageously, during the same step 110, the compute client 13A requests also the identifier of the current I/O client 14 from the server 12.

During the same step 110, the server 12 receives the request from the compute client 13A and sends to the compute client 13A a computation ticket corresponding to a task to be executed by this client.

Advantageously, the server 12 sends also the identifier of the current I/O client 14.

During the next step 120, the compute client 13A receives the computation ticket from the server 12 and determines input data requested to execute the task defined by the ticket.

During this step 120, the compute client 13A may also request the identifier of the current I/O client 14 if it was not done during the previous step or if a confirmation of this identifier is required.

During the next step 130, the compute client 13A collects the requested input data from the current I/O client 14 using the known identifier of this I/O client 14.

If during this step 130, the I/O client 14 is unable to provide the requested input data, the compute client 13A reads this data directly from the distributed file system 15.

Advantageously, the compute client 13A pre-processes this data.

During the next step 140, the compute client 13A executes the task defined by the computation ticket using the collected input data and produces corresponding output data.

Further, during the same step 140, the compute client 13A may post-process the produced output data.

During the next step 150, the compute client 13A writes the produced output data to the distributed file system 15.

At the end of this step, the compute client 13A becomes available for a new task and proceeds to a new iteration of the method.

The method of data transmission according to the second embodiment of the invention will now be explained in reference to FIG. 4.

Like in the previous case, the method of data transmission according to the second embodiment of the invention is implemented by at least one compute client 13A, . . . , 13N, for example by the compute client 13A.

Similarly to the previous case, initially, the I/O client 14 is designated for example by the server 12 or by any other meta-server. This client 14 is thus called "current I/O client 14" hereinafter.

If the current I/O client 14 is not available during the method's execution, the server 12 or any other meta-server designates another I/O client among for example one of the compute clients. The designated I/O client will be thus called "current I/O client 14".

The initial step 210 of the method according to the second embodiment of the invention is identical to the initial step 110 of the method according to the first embodiment of the invention.

Particularly, during this initial step 210, the compute client 13A requests from the server 12 a computation ticket, eventually with the identifier of the current I/O client 14.

During the next step 220, the compute client 13A receives the computation ticket from the server 12 and determines input data requested to execute the task defined by the ticket.

During the next step 230, the compute client 13A reads the requested input data from the distributed file system 15.

During the next step 240, the compute client 13A executes the task defined by the computation ticket using the read input data and produces corresponding output data.

During the next step 250, the compute client 13A sends the produced output data to the current I/O client 14.

Before sending this data, the compute client 13A may request the identifier of the current I/O client 14 from the server 12 if this identifier is not available or if the current I/O client 14 is not available.

At the end of this step, the compute client 13A becomes available for a new task and proceeds to a new iteration of the method.

Thus, the output data produced by the compute client 13A is transmitted to the current I/O client 14 who implements a post-processing of this data immediately after its reception. According to some embodiments, the I/O client implements a post-processing after receiving all output data linked to the task executed by the compute client 13A, from the other compute clients 13B, . . . , 13N.

Advantageously, the current I/O client 14 stocks periodically output data received from different compute clients 13A, . . . , 13N in the distributed file system 15. This periodicity corresponds for example to each hundred of tickets processed by the server 12. Such process is called "checkpoint" and ensures fault tolerance of the I/O client. More precisely, it reduces impact in the case where the current I/O client has any material or software failure.

Advantageously, after completing the post-processing, the I/O client 14 stocks the results of this post-processing in the distributed file system 15.

It is clear that the embodiments of the method explained in reference to FIGS. 3 and 4 can be combined one with the other.

Thus, for example, while executing the method according to the second embodiment, the step 230 of reading input data from the distributed file system 15 can be replaced by the step 130 of collecting input data from the current I/O client 14. Moreover, it is possible to use several I/O clients for implement different steps of such a mixed embodiment.

In other words, the embodiments of the method can be applied simultaneously using a same I/O client or different I/O clients. Moreover, it is clear that during execution of the method, designations of a server, a compute client, an I/O client and a distributed file system can be interchanged using the multi-service model manager layer 25 of each one of these computing units.

Finally, it is possible do not designate any I/O client for at least some tasks. In this case, the system 10 operates according to the classical "ticket service" model.

One can conceive that the invention presents numerous advantages.

First of all, the invention accelerates considerably I/O exchanges in a supercomputer system. Indeed, the I/O exchanges with the I/O client are faster than the I/O exchanges with the distributed file system.

This is particularly advantageous when redundant data is frequently used by the compute clients or when a reduction of final result is possible based on the overlap of intermediate output produced by the compute clients.

Further, the invention is based on the classical "ticket service" model which makes it possible to distribute efficiently tasks between different clients and reduces the risk to lose a task or a computation ticket corresponding to this task. Moreover, this model gives the possibility of a fault tolerance handling to the supercomputer system.

Finally, the architecture of the supercomputer system is not frozen. It is possible to designate and to re-designate a compute client to be an I/O client or a server or a distributed file system, and vice versa.

The invention claimed is:

1. A supercomputer system comprising at least one server, a plurality of compute clients and a distributed file system;

the server being configured to distribute computation tickets to the compute clients;

each compute client being configured to request a computation ticket from the server and upon receipt of a computation ticket from the server, to execute a task defined by this ticket, each task comprising analyzing input data and producing output data;

the distributed file system being configured to stock input data for all tasks and output data produced by the compute clients;

wherein the supercomputer system comprises at least one I/O client configured to exchange data with each compute client and with the distributed file system, to distribute input data to at least some of the compute clients or to collect output data produced by at least some of the compute clients, wherein each compute client is configured to request corresponding input data from the I/O client and if the I/O client is unable to provide the requested input data, to read the corresponding input data from the distributed file system.

2. The supercomputer system according to claim 1, wherein each compute client is configured to request an identifier of the I/O client from the server.

3. The supercomputer system according to claim 1, wherein an identifier of the I/O client is transmitted by the server after the execution of the corresponding task by the corresponding compute client.

4. The supercomputer system according to claim 1, wherein the I/O client is configured to read periodically input data usable by the compute clients.

5. The supercomputer system according to claim 1, wherein the I/O client is configured to implement a pre-processing of the read input data from the distributed file system.

6. The supercomputer system according to claim 1, wherein each compute client is configured to send all produced output data to the I/O client.

7. The supercomputer system according to claim 1, wherein the I/O client is configured to implement a post-processing of the collected output data.

8. The supercomputer system according to claim 7, wherein the I/O client is configured to stock in the distributed file system results of the post-processing.

9. The supercomputer system according to claim 1, wherein the I/O client is configured to write periodically in the distributed file system the collected output data.

10. The supercomputer system according to claim 1, wherein the server, the I/O client, the distributed file system and each compute client are implemented by one or several physical compute nodes.

11. The supercomputer system according to claim 1, wherein the I/O client is configured to read periodically input data usable by the compute clients and determined by the server, from the distributed file system.

12. The supercomputer system according to claim 1, wherein the server is configured to designate a new I/O client, from one of the compute clients, if the current I/O client is not available.

13. A method of data transmission in a supercomputer system comprising at least one server, a plurality of compute clients, an I/O client and a distributed file system;

the method being implemented by at least one compute client and comprising the following steps:
requesting a computation ticket from the server;
receiving a computation ticket from the server; and
executing a task defined by this ticket, each task comprising analyzing input data and producing output data, input data being stocked in the distributed file system and output data being intended to be stocked or processing in or by the distributed file system;

wherein the method further comprises a step of collecting input data from the I/O client or a step of sending output data to the I/O client, wherein each compute client is configured to request corresponding input data from the I/O client and if the I/O client is unable to provide the requested input data, to read the corresponding input data from the distributed file system.

14. A non-transitory computer program product comprising software instructions which, when executed by a processor, implement a method of data transmission in a supercomputer system comprising at least one server, a plurality of compute clients, an I/O client and a distributed file system;

the method being implemented by at least one compute client and comprising the following steps:
requesting a computation ticket from the server;
receiving a computation ticket from the server; and
executing a task defined by this ticket, each task comprising analyzing input data and producing output data, input data being stocked in the distributed file system and output data being intended to be stocked or processing in or by the distributed file system;

wherein the method further comprises a step of collecting input data from the I/O client or a step of sending output data to the I/O client, wherein each compute client is configured to request corresponding input data from the I/O client and if the I/O client is unable to provide the requested input data, to read the corresponding input data from the distributed file system.

* * * * *